(12) United States Patent
Masuda

(10) Patent No.: US 8,646,256 B2
(45) Date of Patent: Feb. 11, 2014

(54) DIESEL ENGINE

(75) Inventor: Hiroshi Masuda, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 335 days.

(21) Appl. No.: 13/061,861

(22) PCT Filed: Jun. 5, 2009

(86) PCT No.: PCT/JP2009/060363

§ 371 (c)(1),
(2), (4) Date: May 24, 2011

(87) PCT Pub. No.: WO2010/026813

PCT Pub. Date: Mar. 11, 2010

(65) Prior Publication Data

US 2011/0265462 A1    Nov. 3, 2011

(30) Foreign Application Priority Data

Sep. 3, 2008  (JP) .................................. 2008-226300

(51) Int. Cl.
*F01N 3/00* (2006.01)
*F01N 3/02* (2006.01)

(52) U.S. Cl.
USPC ............................................. 60/295; 60/311

(58) Field of Classification Search
USPC .......................................... 60/295, 297, 311
See application file for complete search history.

(56) References Cited

FOREIGN PATENT DOCUMENTS

| JP | 2001-280121 A | 10/2001 |
|---|---|---|
| JP | 2003-161139 A | 6/2003 |
| JP | 2003278575 A | * 10/2003 |
| JP | 2004-044524 A | 2/2004 |
| JP | 2004-360480 A | 12/2004 |
| JP | 3719393 B2 | 9/2005 |
| JP | 3719393 B2 | 11/2005 |
| JP | 2006-118461 A | 5/2006 |
| JP | 2006-242098 | 9/2006 |
| JP | 2006-266221 A | 10/2006 |
| JP | 2006-316733 A | 11/2006 |

OTHER PUBLICATIONS

Notice of Reasons for Refusal for related Japanese Appl. No. 2008-226300, Japanese Patent Office, mailed Sep. 25, 2012, 8 pgs.
International Search Report for PCT/JP2009/060363, Japanese Patent Office, mailed Sep. 15, 2009, 4 pages.

* cited by examiner

*Primary Examiner* — Kenneth Bomberg
*Assistant Examiner* — Audrey K Bradley
(74) *Attorney, Agent, or Firm* — Sterne, Kessler, Goldstein & Fox P.L.L.C.

(57) ABSTRACT

An object is to provide a diesel engine (2) capable of reliably preventing an excessive rise in temperature inside a particulate filter (10) and capable of rapidly enabling driving in a low-rotation and low-load area when there is no possibility of excessive rise in temperature. A diesel engine (2) includes a diesel engine (2) exhaust emission purifier (1). The diesel engine (2) exhaust emission purifier (1) includes a particulate filter (10) and a controller (21) for forcibly removing a particulate accumulable in the particulate filter (10). The controller (21) is configured to prohibit the diesel engine (2) from entering a predetermined low-rotation and low-load area if a load rotation changes when the particulate filter (10) has a temperature that is equal to or higher than a first predetermined temperature T1 and when the particulate is accumulated in an amount that is equal to or more than a predetermined amount.

8 Claims, 6 Drawing Sheets

DIESEL ENGINE

TECHNICAL FIELD

The present invention relates to a technique regarding diesel engines, and more particularly, to a technique regarding a diesel engine having a purifier that includes a particulate filter and regenerating means for forcibly removing particulates accumulated in the particulate filter.

BACKGROUND ART

Conventionally, as a technique to trap particulates (carbonaceous soot, high-boiling point hydrocarbon components (SOF), and other substances) contained in exhaust gas discharged from a diesel engine, a technique has been known that an engine exhaust emission purifier including a particulate filter is equipped along an exhaust stream of a diesel engine. The particulate filter has a porous honeycomb structure made of ceramics or other material, and the particulate filter has a configuration in which inlets of respective flow paths defined in a lattice form are alternately sealed up while outlets of flow paths whose inlets are unsealed are sealed up, to discharge only exhaust as that has permeated through porous walls defining the respective flow paths to a downstream.

In such a particulate filter, trapped particulates are accumulated in the particulate filter to gradually increase exhaust resistance, and thus it is necessary to burn the accumulated particulates appropriately to regenerate the particulate filter. As a regeneration method of a particulate filter, a technique is known that an electrothermal heater is provided on an upper-stream side of an oxidation catalyst-loaded filter along an exhaust stream of a diesel engine, to raise the temperature of exhaust gas introduced to the oxidation catalyst-loaded filter by heating with the heater (see Patent document 1).

In the case where the diesel engine is put into a driving state such as idle driving, in which the exhaust flow volume is low during the forceful regeneration of the particulate filter by raising the temperature of the particulate filter, there is a problem in that not much of the heat generated due to combustion of particulates is brought out of the particulate filter through exhaust emission, which causes an excessive rise in temperature inside the particular filter, resulting in thermal degradation of the particulate filter. In view of this, a technique is known that, in the case where a deceleration of a vehicle is detected when the temperature of the particular filter is higher than a reference temperature, when a state in which the temperature of the particular filter is higher than the reference temperature continues for equal to or longer than a predetermined period of time, then exhaust flow volume reduction restraining means is operated to restrain a reduction in flow volume of exhaust flowing into the particular filter, while when the continued period of time of the state in which the temperature of the particular filter is higher than the reference temperature is shorter than the reference time, then the exhaust flow volume reduction restraining means is prohibited from operating (see, for example, Patent document 2).

[Patent Document 1] Japanese Unexamined Patent Application Publication No. 2001-280121.
[Patent Document 2] Japanese Unexamined Patent Application Publication No. 2006-118461.

DISCLOSURE OF THE INVENTION

Problems to be Solved by the Invention

However, in the control disclosed in Patent Document 2, when the temperature of the particulate filter is raised to a high temperature earlier than the reference time and an excessive rise in temperature occurs, the particulate filter may be thermally degraded. Further, the exhaust flow volume reduction restraining means is continuously operated even in the case where the temperature of the particulate filter drops earlier than the reference time and thus there is no possibility of excessive rise in temperature in the particulate filter. This disables driving of the diesel engine in its low-rotation and low-load area, resulting in unnecessary consumption of fuel.

In view of the above-described problems, the present invention provides a diesel engine capable of reliably preventing an excessive rise in temperature inside the particulate filter and capable of rapidly enabling driving in a low-rotation and low-load area when there is no possibility of excessive rise in temperature, making it possible to prevent unnecessary consumption of fuel.

Means of Solving the Problems

The problems to be solved by the present invention have been described hereinabove, and subsequently; means of solving the problems are described.

According to an embodiment, a diesel engine includes a diesel-engine exhaust emission purifier. The diesel-engine exhaust emission purifier includes a particulate filter and regenerating means for forcibly removing a particulate accumulable in the particulate filter to regenerate the particulate filter. The diesel engine is configured to prohibit the diesel engine from entering a predetermined low-rotation and low-load area if a load rotation changes when the particulate filter has a temperature that is equal to or higher than a predetermined regulation temperature and when the particulate is accumulated in an amount that is equal to or more than a predetermined amount. The diesel engine includes notifying means for notifying an operator that entering the low-rotation and low-load area is prohibited.

According to another embodiment, if the load rotation changes, the diesel engine may be configured to prohibit the diesel engine from entering the predetermined low-rotation and low-load area only when the temperature of the particulate filter is equal to or higher than the predetermined regulation temperature and is equal to or higher than the predetermined regulation temperature continuously for equal to or longer than a predetermined period of time.

According to still another embodiment, if the load rotation changes, the diesel engine may be configured to prohibit the diesel engine from entering the predetermined low-rotation and low-load area only when the temperature of the particulate filter is equal to or higher than the predetermined regulation temperature and when a temperature integral value for a predetermined period of time exceeds a predetermined value.

According to another embodiment, the diesel engine may be configured to release control of prohibiting entrance of the low-rotation and low-load area when the temperature of the particulate filter drops to a temperature that is equal to or lower than a predetermined release temperature.

According to another embodiment, the diesel engine may be configured to release the control of prohibiting entrance of the low-rotation and low-load area when the temperature of the particulate filter continues to drop for a predetermined period of time.

According to another embodiment, the diesel engine may be configured to release control of prohibiting entrance of the low-rotation and low-load area when the temperature of the particulate filter drops by equal to or more than a predetermined temperature width from a maximum temperature to which the temperature of the particulate filter has reached.

According to the other embodiment, the diesel engine may be configured to release control of prohibiting entrance of the low-rotation and low-load area when the temperature of the particulate filter drops by a predetermined value of temperature from a temperature of the particulate filter at a time of starting the control of prohibiting entrance of the low-rotation and low-load area.

Effects of the Invention

The embodiments of the present invention provide the following advantageous effects.

According to the first embodiment, it is possible to reliably prevent an excessive rise in temperature inside the particulate filter, and thus to prevent thermal degradation of the particulate filter.

According to the second embodiment, it is possible to reliably prevent an excessive rise in temperature inside the particulate filter, and thus to prevent thermal degradation of the particulate filter. Further, the diesel engine is configured to prohibit the diesel engine from entering the predetermined low-rotation and low-load area only when the temperature of the particulate filter is equal to or higher than the predetermined regulation temperature continuously for equal to or longer than a predetermined period of time. This makes it possible to reliably prevent thermal degradation of the particulate filter only when it is certain that the temperature is excessively rising.

According to the third embodiment, it is possible to reliably prevent an excessive rise in temperature inside the particulate filter, and thus to prevent thermal degradation of the particulate filter. Further, the diesel engine is configured to prohibit the diesel engine from entering the predetermined low-rotation and low-load area only when a temperature integral value for a predetermined period of time exceeds a predetermined value, entering the low-rotation and low-load area can be promptly prohibited when the temperature is excessively rising to significantly exceed the predetermined regulation temperature, making it possible to prevent thermal degradation.

According to the fourth embodiment, the diesel engine is configured to release the control of prohibiting entrance of the low-rotation and low-load area so as to rapidly enable driving in the low-rotation and low-load area, making it possible to prevent unnecessary consumption of fuel. Further, the diesel engine rapidly recovers its driving range to minimize adverse effects on the driving.

According to the fifth embodiment, the diesel engine is configured to release the control of prohibiting entrance of the low-rotation and low-load area so as to rapidly enable driving in the low-rotation and low-load area, making it possible to prevent unnecessary consumption of fuel. Further, even if the temperature of the particulate filter does not drop to a predetermined temperature, when the temperature of the particulate filter continues to drop for a predetermined period of time, the diesel engine rapidly recovers its driving range to minimize adverse effects on the driving.

According to the sixth embodiment, the diesel engine is configured to release the control of prohibiting entrance of the low-rotation and low-load area so as to rapidly enable driving in the low-rotation and low-load area, making it possible to prevent unnecessary consumption of fuel. Further, even if the temperature of the particulate filter does not drop to a predetermined temperature, when the temperature of the particulate filter drops by equal to or more than a predetermined temperature width from a maximum temperature of the particulate filter, the diesel engine rapidly recovers its driving range to minimize adverse effects on the driving.

According to the seventh embodiment, the diesel engine is configured to release the control of prohibiting entrance of the low-rotation and low-load area so as to rapidly enable driving in the low-rotation and low-load area, making it possible to prevent unnecessary consumption of fuel. Further, even if the temperature of the particulate filter does not drop to a predetermined temperature, when the temperature of the particulate filter drops by a predetermined value of temperature from a temperature of the particulate filter at the time of starting the control of prohibiting entrance of the low-rotation and low-load area, the diesel engine rapidly recovers its driving range to minimize adverse effects on the driving.

BEST MODE FOR CARRYING OUT THE INVENTION

Next, embodiments of the present invention will be described.

Figure 1:
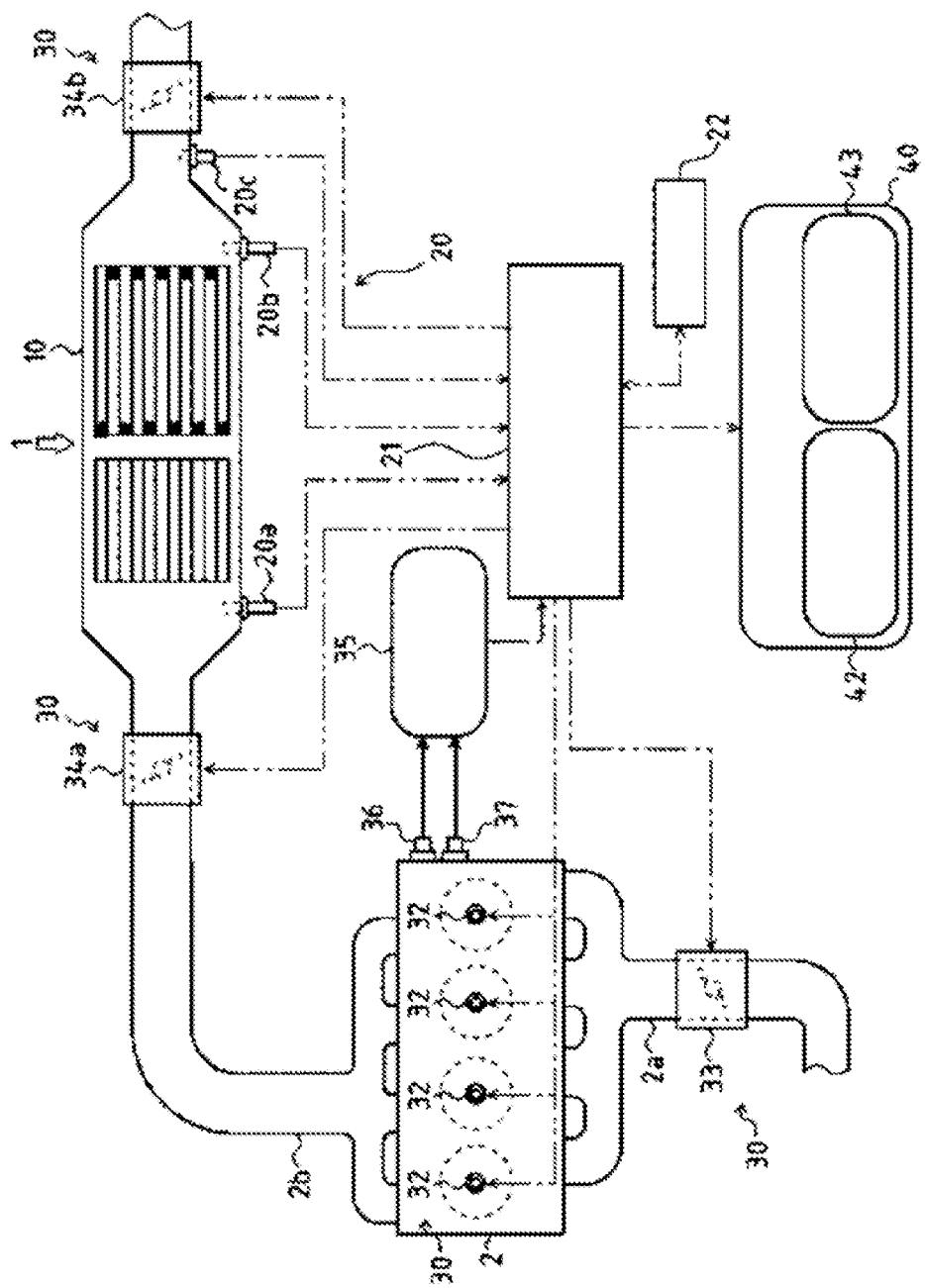
FIG. 1 is a schematic diagram illustrating an arrangement of a diesel-engine exhaust emission purifier according to an embodiment of the present invention.
Figure 2:
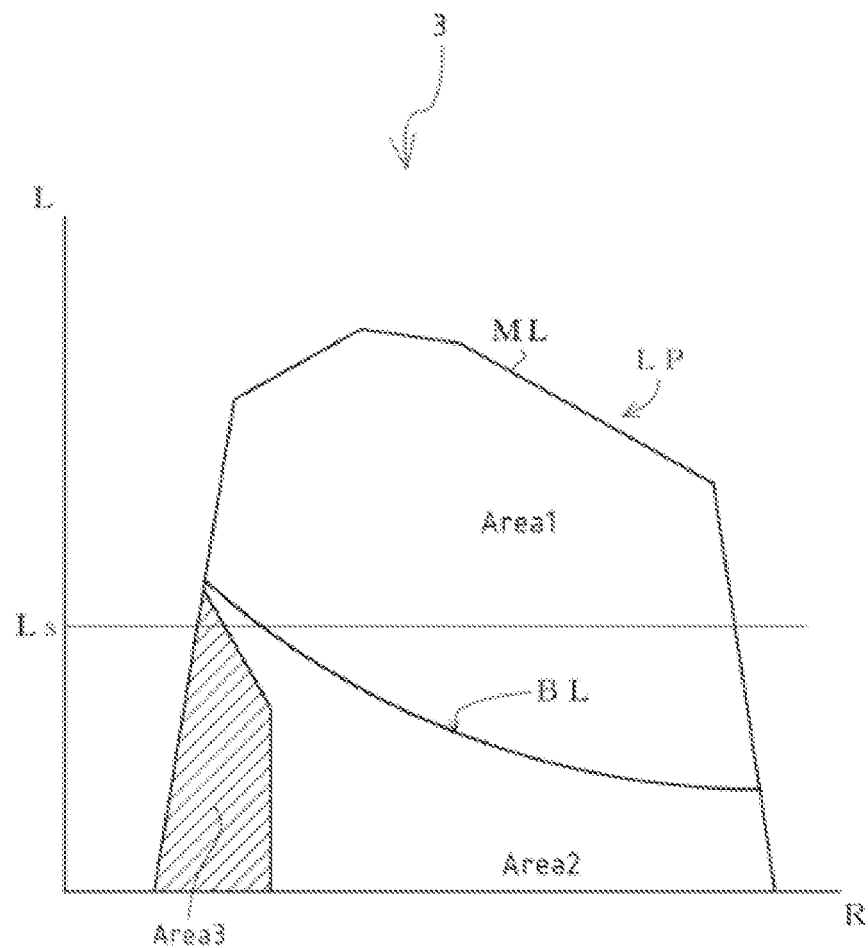
FIG. 2 is a diagram illustrating a relationship between engine load and engine rotational speed.
Figure 3:
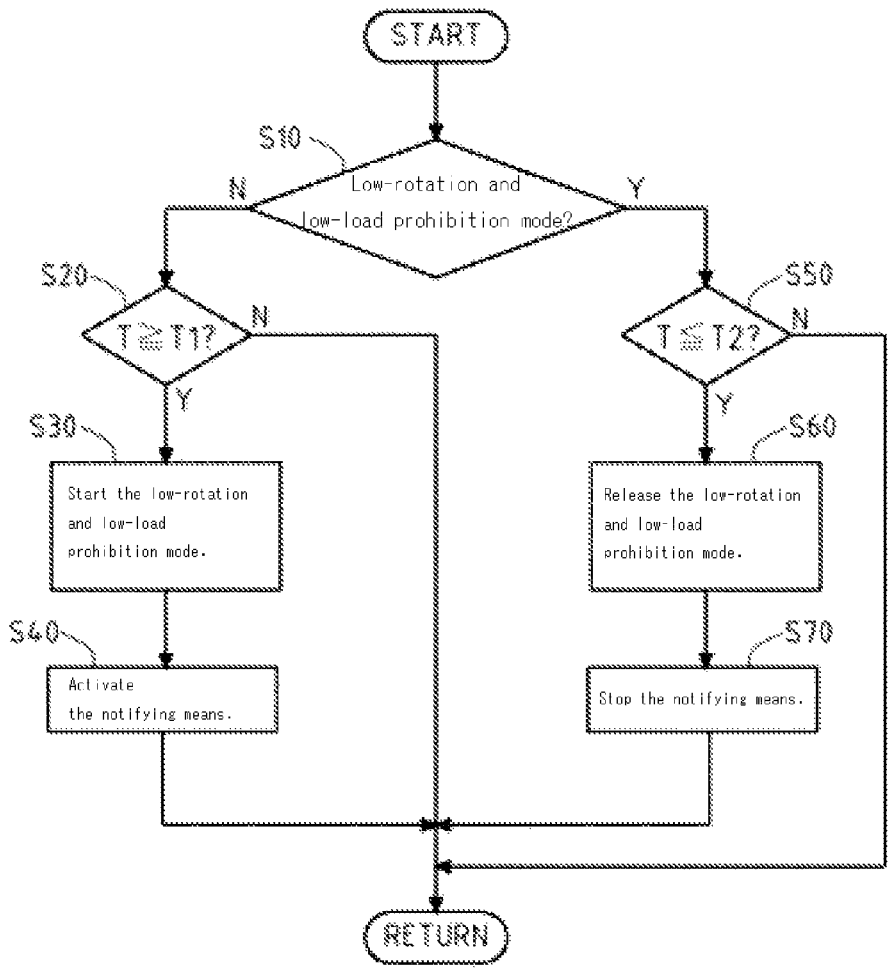
FIG. 3 is a flowchart illustrating a flow of low-rotation and low-load prohibition control.
Figure 4:
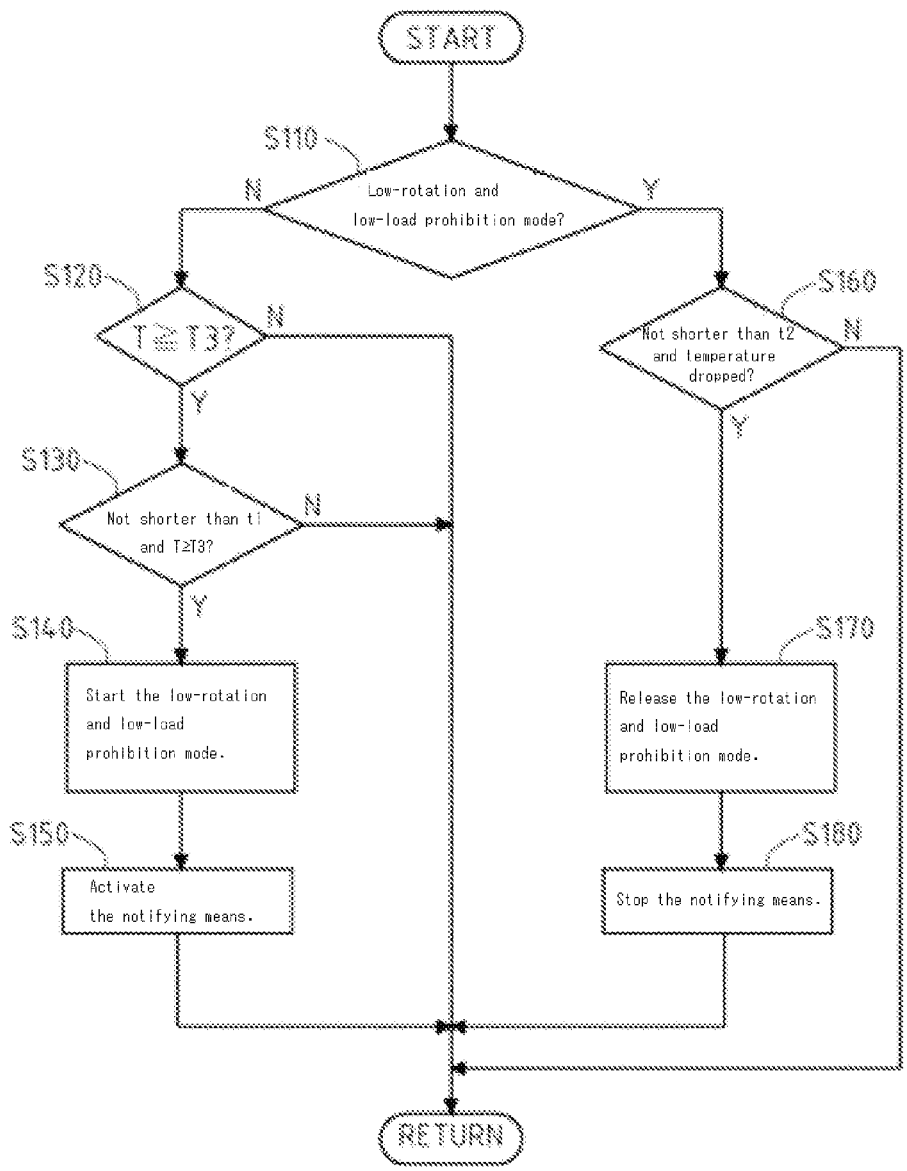
FIG. 4 is a flowchart illustrating a flow of low-rotation and low-load prohibition control.
Figure 5:
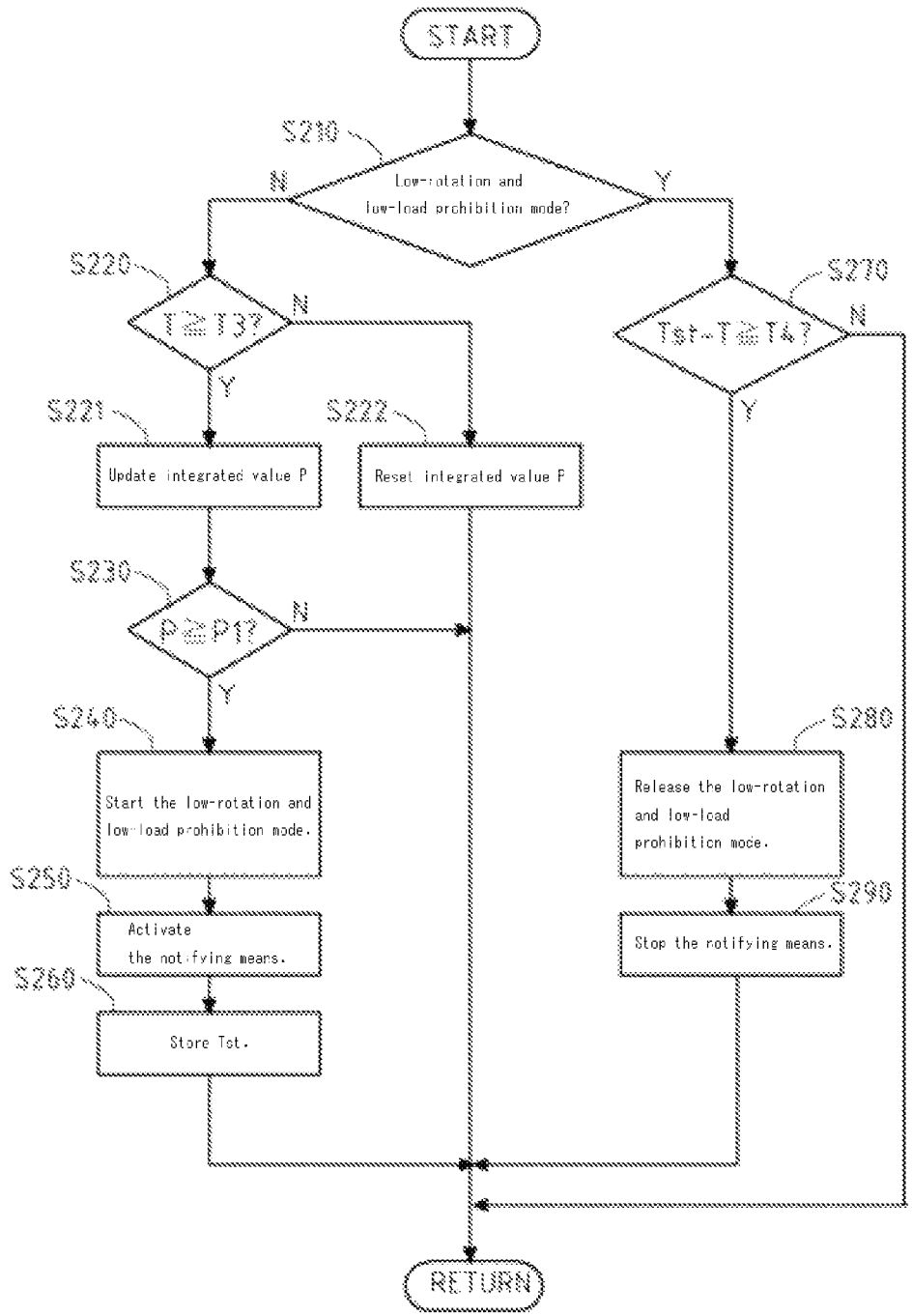
FIG. 5 is a flowchart illustrating a flow of low-rotation and low-load prohibition control.
Figure 6:
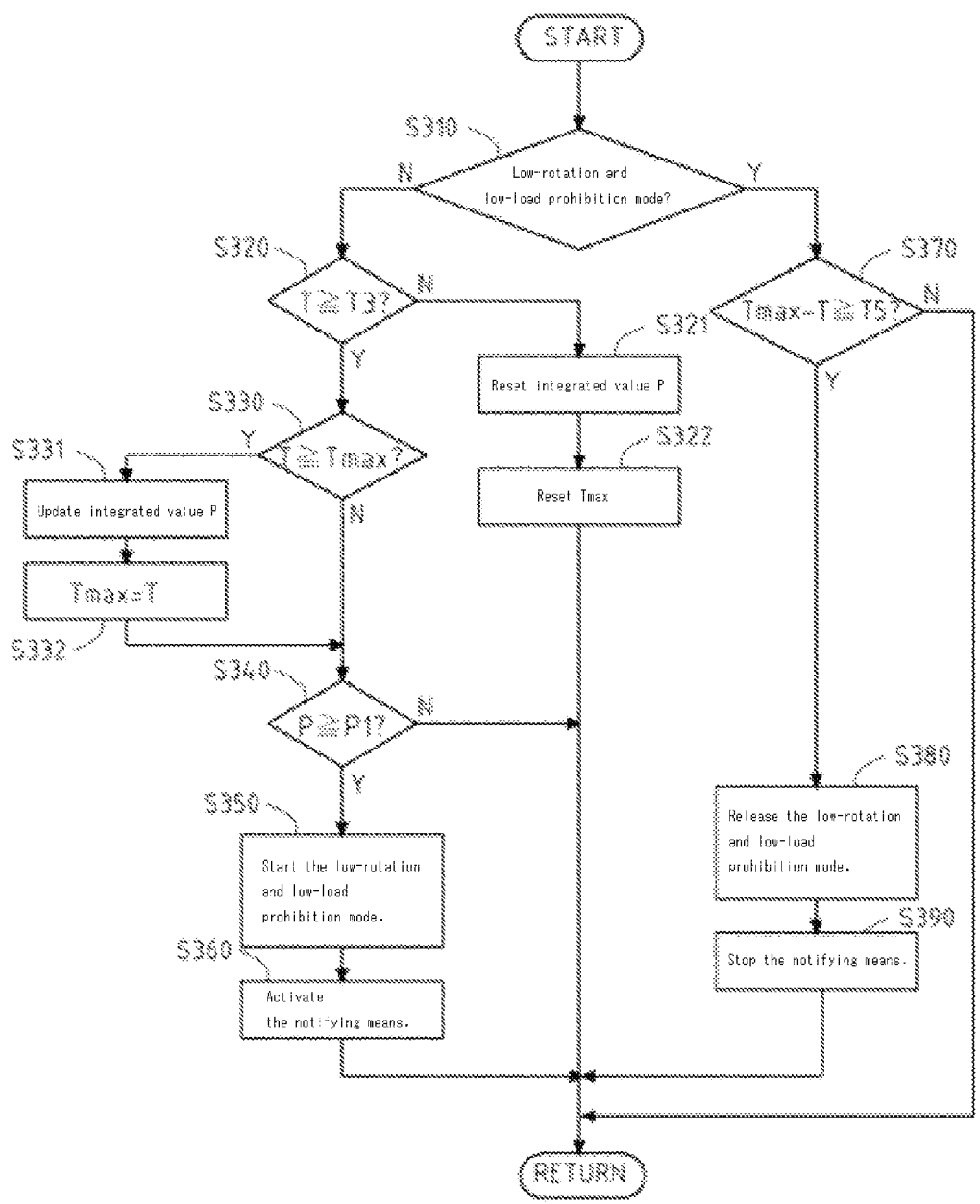
FIG. 6 is a flowchart illustrating a flow of low-rotation and low-load prohibition control.

FIG. 1 is a schematic diagram illustrating a configuration of a diesel-engine exhaust emission purifier according to an embodiment of the present invention. FIG. 2 is a diagram illustrating a relationship between engine load and engine rotational speed. FIG. 3 is a flowchart illustrating a flow of low-rotation and low-load prohibition control. FIG. 4 is a flowchart illustrating a flow of low-rotation and low-load prohibition control. FIG. 5 is a flowchart illustrating a flow of low-rotation and low-load prohibition control. FIG. 6 is a flowchart illustrating a flow of low-rotation and low-load prohibition control.

A diesel-engine exhaust emission purifier 1 that is one embodiment of a diesel-engine exhaust emission purifier according to the present invention will be hereinafter described.

<Configuration of the Exhaust Emission Purifier>

As shown in FIG. 1, the diesel-engine exhaust emission purifier 1 is included in a diesel engine 2 that is one embodiment of a diesel engine in the present invention. The diesel-engine exhaust emission purifier 1 purifies exhaust gas generated in the diesel engine 2 and discharges the purified gas.

The diesel-engine exhaust emission purifier 1 includes a particulate filter 10, detecting means 20, a controller 21, regenerating means 30, notifying means 40, and other elements.

The particulate filter 10 is provided along an exhaust stream 2b of the diesel engine 2 so as to remove particulates (carbonaceous soot, high-boiling point hydrocarbon components (SOF), and other substances) contained in exhaust gas. Specifically, the particulate filter 10 has a honeycomb structure including porous walls of ceramics or other material to assure that exhaust gas is discharged after permeating through the porous walls. When the exhaust gas passes through the porous walls, particulates in the exhaust gas are trapped inside the porous walls. As a result, the particulates are removed from the exhaust gas.

The detecting means 20 detects exhaust pressures on the upper-stream side and the down-stream side of the particulate filter 10. Specifically; the detecting means 20 includes an inlet side pressure sensor 20a provided on an inlet side of the particulate filter 10, an outlet side pressure sensor 20b provided on the outlet side of the particulate filter 10, a temperature sensor 20c to detect an exhaust gas temperature of the particulate filter 10, and other sensors. The detecting means 20 is coupled to the controller 21.

The controller 21 is coupled to the detecting means 20, the regenerating means 30, the notifying means 40, a driving state detecting unit 35, and other elements. The controller 21 mainly includes a memory unit 22, an operating unit, and other units, and the memory unit 22 includes a ROM that stores types of control programs, a RAM used as a working area for data storage and for executing the programs, and other elements.

The controller 21 carries out operations for the degree of fullness of the particulate filter 10 from a pressure and other parameters of the particulate filter 10 detected by the detecting means 20, so as to determine whether particulates accumulated in the particulate filter 10 should be removed.

Further, the controller 21 determines a regeneration method of the particulate filter 10 corresponding to the driving state of the diesel engine 2, and operate the regenerating means 30 to raise the exhaust gas temperature so as to combust and remove particulates accumulated in the particulate filter 10, thus regenerating the particulate filter 10.

The driving state detecting unit 35 carries out operations for engine load and other parameters from detected values from engine rotation detecting means 36, engine rotational speed setting means 37, and other elements so as to detect the driving state of the diesel engine 2. In addition, in the case of an electronic governor engine, the driving state detecting unit 35 detects rack positions as well.

The regenerating means 30, specifically, includes fuel injection valves 32, ..., 32, an intake throttle valve 33, an inlet-side exhaust throttle valve 34a, an outlet-side exhaust throttle valve 34b, and other elements. The fuel injection valves 32, ..., 32, the intake throttle valve 33, the inlet-side exhaust throttle valve 34a, and the outlet-side exhaust throttle valve 34b are coupled to the controller 21. Then, during regeneration, the controller 21 appropriately operates the fuel injection valves 32, ..., 32, the intake throttle valve 33, the inlet-side exhaust throttle valve 34a, and the outlet-side exhaust throttle valve 34b to drive the engine in a regeneration enabling area, which will be described later while maintaining a set rotational speed. Specific methods for regeneration include a method in which an unburned fuel is increased by increasing the amount of fuel injection or throttling the intake throttle valve 33 so as to combust particulates in the particulate filter 10, thus regenerating the particulate filter 10, and a method in which the inlet-side exhaust throttle valve 34a or the outlet-side exhaust throttle valve 34b is throttled to cause an increase in load, thus regenerating the particulate filter 10. It is noted, however, that the regeneration method is not limited.

The fuel injection valves 32, ..., 32 include electromagnetic valves and other elements, and inject fuel directly into a plurality of cylinders arranged in the diesel engine 2. The timing of fuel injection into the cylinders is changed to enable changes in rotational speed, load, and other parameters, and to enable changes in exhaust temperature and enable supply of unburned fuel to exhaust gas.

The intake throttle valve 33 includes an electromagnetic valve or a valve element opened and closed by an actuator, and is provided along an intake stream 2a in the diesel engine 2 to adjust the air inflow volume of the diesel engine 2. By changing the openness of the intake throttle valve 33, it is possible to change the exhaust flow volume, exhaust temperature, and exhaust rate of exhaust gas.

The inlet-side exhaust throttle valve 34a includes an electromagnetic valve or a valve element opened and closed by an actuator, and is provided on the inlet side of the particulate filter 10 to adjust the exhaust gas inflow volume of the particulate filter 10. By changing the openness of the inlet-side exhaust throttle valve 34a, it is possible to change the exhaust pressure, exhaust flow volume, and exhaust rate of exhaust gas.

The outlet-side exhaust throttle valve 34b includes an electromagnetic valve or a valve element opened and closed by an actuator, and is provided on the outlet side of the particulate filter 10 to adjust the exhaust gas outflow volume of the particulate filter 10. By changing the openness of the outlet-side exhaust throttle valve 34b, it is possible to change the exhaust pressure, exhaust flow volume, and exhaust rate of exhaust gas.

The engine rotation detecting means 36 includes a sensor disposed at a crank shaft, a flywheel, or other part to detect the rotational angle and rotational speed of the crank shaft. The engine rotation detecting means 36 is coupled to the controller 21. That is, the engine rotation detecting means 36 is capable of sensing piston positions of the respective cylinders to control the timing of injection, the amount of injection volume, and other parameters.

The engine rotational speed setting means 37 sets the engine rotational speed using an accelerator lever, a control lever, or other lever, and to detect the setting position of the an engine rotational speed. The engine rotational speed setting means 37 is coupled to the controller 21.

The notifying means 40 is means for notifying whether the particulate filter 10 is being regenerated, and makes such notification before the regeneration starts, makes a notification regarding the regeneration method, and makes other notification. The notifying means 40 includes visual notifying means 42 such as a monitor, or acoustic notifying means 43 such as a speaker. The notifying means 40 is coupled to the controller 21.

The visual notifying means 42 notifies a worker of the regeneration method of the particulate filter 10 using visual information. Specifically, the visual notifying means 42 is a control lamp to notify that a low-rotation and low-load prohibition mode, which will be described later, is started. It is noted that the visual notifying means 42 is not limited to the control lamp, and may be, for example, a liquid-crystal screen or other device.

Further, the acoustic notifying means 43 notifies a worker of whether the particulate filter 10 is being regenerated using acoustic information. Specifically, the acoustic notifying means 43 makes, as acoustic information from a speaker, a buzzer, or another device, a notification regarding the timing of regeneration of the particulate filter 10 determined by the controller 21, and a notification regarding a case where the regeneration method of the particulate filter 10 has been changed during execution of regeneration of the particulate filter 10.

The controller 21 is capable of controlling the openness of the intake throttle valve 33 to adjust the volume of air inflow into the diesel engine 2. Thus, the controller 21 is capable of changing the exhaust flow volume, exhaust temperature, and exhaust rate of exhaust gas.

Further, the controller 21 is capable of controlling the fuel injection volumes of the fuel injection valves 32, ..., 32 and the fuel injection timing of the fuel injection valves 32, ..., 32 to shift the timing of combustion, making it possible to change the exhaust temperature and add unburned fuel to the exhaust gas.

Further, the controller 21 is capable of controlling the openness of the inlet-side exhaust throttle valve 34a to change the exhaust gas pressure before the particulate filter 10, making it possible to change the pressure and exhaust rate of exhaust gas.

Further, the controller 21 is capable of controlling the openness of the outlet-side exhaust throttle valve 34b to change the exhaust gas pressure inside the particulate filter 10, making it possible to change the pressure and exhaust velocity of exhaust gas.

Next, the filter regeneration control of the particulate filter 10 will be described.

The diagram shown in FIG. 2 is a diagram of a load pattern illustrating a relationship between engine rotational speed R and engine load L at the time of driving of the diesel engine 2, and the load pattern is stored in the storage unit 22. In FIG. 2, an engine rotational speed is plotted on the horizontal axis while an engine load that is correlated with a rack position is plotted on the vertical axis. In this case, a reference load value Ls is expressed by a horizontal straight line of L=Ls.

A load pattern LP of the present embodiment is an area defined by a maximum torque line ML that is an upward convex line, and is vertically divided with a boundary line BL that shows a relationship between engine rotational speed R and engine load L at the time when the exhaust gas temperature is at a regeneration enabling temperature. The area above the boundary line BL is a regeneration enabling area Area1 in which particulates accumulated in the particulate filter 10 can be removed, and the area below the boundary line BL is a regeneration disabling area Area2 in which particulates are not removed but accumulated in the filter body.

In the filter regeneration control, it is judged whether particulates trapped by the particulate filter 10 are accumulated in the particulate filter 10 in an amount that is equal to or more than a predetermined amount. When the particulates are accumulated in such an amount, and when the diesel engine 2 is in the regeneration disabling area Area2 of the load pattern LP, then the filter regeneration control is performed. In this case, the regenerating means 30 is operated to raise the exhaust gas temperature so as to combust and remove the particulates accumulated in the particulate filter 10, thus regenerating the particulate filter 10.

Next, the low-rotation and low-load prohibition control in the filter regeneration control will be described. When the diesel engine 2 with a large amount of particulates accumulated in the particulate filter 10 rapidly enters a low-rotation and low-load area Area3, the temperature inside the particulate filter 10 rapidly rises which leads to an excessive rise in temperature, which in turn causes thermal degradation of the particulate filter 10 in some cases. In view of this, when certain conditions are fulfilled in the filter regeneration control, the diesel engine 2 prohibits itself from entering the low-rotation and low-load area Area3, which is predetermined as shown by shading in FIG. 2, if the load rotation changes. In this respect, the control mode in which the diesel engine 2 prohibits itself from entering the low-rotation and low-load area Area3 will be referred to as a low-rotation and low-load prohibition mode. Hereinafter, a control method will be described in accordance with flowcharts.

Embodiment 1

As shown in FIG. 3, first, it is judged whether the control mode is the low-rotation and low-load prohibition mode (step S10). When the control mode is not the low-rotation and low-load prohibition mode, it is judged whether an exhaust temperature T of the particulate filter 10 sensed by the temperature sensor 20c is equal to or higher than a first set temperature T1, which is a predetermined regulation temperature (step S20). When the exhaust temperature T is equal to or higher than the first set temperature T1, it is judged that there is a possibility of excessive rise in temperature. Then, the low-rotation and low-load prohibition mode starts (step S30) and the notifying means 40 is activated. Specifically, a control lamp serving as the visual notifying means 42 is turned on (step S40). When the exhaust temperature T is lower than the first set temperature T1, it is judged that there is no possibility of excessive rise in temperature, and the low-rotation and low-load control is terminated.

Meanwhile, when the control mode is the low-rotation and low-load prohibition mode, it is judged whether the exhaust temperature T of the particulate filter 10 is equal to or lower than a second set temperature T2 (step S50). When the exhaust temperature T is equal to or lower than the second set temperature T2, which is a predetermined release temperature, it is judged that there is no possibility of excessive rise in temperature. Then, the low-rotation and low-load prohibition mode is released (step S60), and the notifying means 40 is stopped. Specifically, a control lamp serving as the visual notifying means 42 is turned off (step S70). When the exhaust temperature T is higher than the second set temperature T2, it is judged that there is continuously a possibility of excessive rise in temperature. Then, the low-rotation and low-load prohibition mode is continued, and the low-rotation and low-load prohibition control is terminated. It is noted that the second set temperature T2, which is the predetermined release temperature, is set lower than the first set temperature T1, which is the predetermined regulation temperature.

With such a configuration, it is possible to reliably prevent an excessive rise in temperature inside the particulate filter 10, and thus to prevent thermal degradation of the particulate filter 10.

Further, releasing the control of prohibiting entrance of the low-rotation and low-load area Area3 rapidly enables driving in the low-rotation and low-load area Area3, making it possible to prevent unnecessary consumption of fuel. Further, the diesel engine rapidly recovers its driving range to minimize adverse effects on the driving.

Embodiment 2

In another embodiment, as shown in FIG. 4, first, it is judged whether the control mode is the low-rotation and low-load prohibition mode (step S110). When the control mode is not the low-rotation and low-load prohibition mode, it is judged whether the exhaust temperature T of the particulate filter 10 sensed by the temperature sensor 20c is equal to or higher than a third set temperature T3, which is a predetermined regulation temperature (step S120). When the exhaust temperature T is lower than the third set temperature T3, it is judged that there is no possibility of excessive rise in temperature, and the low-rotation and low-load prohibition control is terminated. When the exhaust temperature T is equal to or higher than the third set temperature T3, it is judged whether the period of time for which the exhaust temperature T continues to be equal to or higher than the third set temperature T3 is equal to or longer than t1 (step S130). When the period of time is shorter than t1, it is judged that there is no possibility of excessive rise in temperature, and the low-rotation and low-load prohibition control is terminated. When the period of time is equal to or longer than t1, it is judged that there is a possibility of excessive rise in temperature. Then, the low-rotation and low-load prohibition mode starts (step S140), and the notifying means 40 is activated. Specifically, the control lamp serving as the visual notifying means 42 is turned on (step S150). It is noted that the third set temperature T3 is set lower than the first set temperature T1.

Meanwhile, when the control mode is the low-rotation and low-load prohibition mode, it is judged whether the exhaust temperature T continues to drop for equal to or longer than a predetermined period of time t2 (step S160). When the exhaust temperature T continues to drop for equal to or longer than the predetermined period of time t2, it is judged that there is no possibility of excessive rise in temperature. Then, the low-rotation and low-load prohibition mode is released (step S170), and the notifying means 40 is stopped. Specifically, the control lamp serving as the visual notifying means 42 is turned off (step S180). When the exhaust temperature T does not continue to drop for equal to or longer than the predetermined period of time t2, it is judged that there is a high possibility of a recurrence of temperature rise, and that there is continuously a possibility of excessive rise in temperature. Then, the low-rotation and low-load prohibition mode continues, and the low-rotation and low-load prohibition control is terminated.

With such a configuration, it is possible to reliably prevent an excessive rise in temperature inside the particulate filter 10, and thus to prevent thermal degradation of the particulate filter 10. Further, the diesel engine prohibits itself from entering the predetermined low-rotation and low-load area Area3 only when the exhaust temperature T is equal to or higher than the third set temperature T3 continuously for equal to or longer than the predetermined period of time t1, which reliably prevents thermal degradation only when it is certain that the temperature is excessively rising.

Further, releasing the control of prohibiting entrance of the low-rotation and low-load area Area3 rapidly enables driving in the low-rotation and low-load area Area3, making it possible to prevent unnecessary consumption of fuel. Further, even if the temperature does not drop to a predetermined temperature, when the exhaust temperature T, which is the temperature of the particulate filter 10, continues to drop for the predetermined period of time t2, the diesel engine rapidly recovers its driving range to minimize adverse effects on the driving.

Embodiment 3

In still another embodiment, as shown in FIG. 5, first, it is judged whether the control mode is in the low-rotation and low-load prohibition mode (step S210). When the control mode is not the low-rotation and low-load prohibition mode, it is judged whether the exhaust temperature T of the particulate filter 10 sensed by the temperature sensor 20c is equal to or higher than the third set temperature T3 (step S220). When the exhaust temperature T is equal to or lower than the third set temperature T3, it is judged that there is no possibility of excessive rise in temperature. Then, an integrated value P is reset (step S222), and the low-rotation and low-load prohibition control is terminated. When the exhaust temperature T is equal to or higher than the third set temperature T3, a temperature-time integration is carried out to update the integrated value P (step S221). Next, it is judged whether the integrated value P is equal to or higher than a predetermined value P1 (step S230). When the integrated value P is lower than the predetermined value P1, it is judged that there is no possibility of excessive use in temperature, and the low-rotation and low-load prohibition control is terminated. When the integrated value P is equal to or higher than the predetermined value P1, it is judged that there is a possibility of excessive rise in temperature. Then, the low-rotation and low-load prohibition mode starts (step S240), and the notifying means 40 is activated. Specifically, the control lamp serving as the visual notifying means 42 is turned on (step S250). Further, a control starting temperature Ts, which is a temperature at the time of starting the control of prohibiting entrance of the low-rotation and low-load area, is stored in the storage unit 22 (step S260).

Further, when the control mode is the low-rotation and low-load prohibition mode, it is judged whether the exhaust temperature T has dropped by equal to or more than a predetermined value of temperature T4 from the control starting temperature Ts (step S270). When the exhaust temperature T has dropped by equal to or more than the predetermined value of temperature T4 from the control starting temperature Ts, it is judged that there is no possibility of excessive rise in temperature. Then, the low-rotation and low-load prohibition mode is released (step S280), and the notifying means 40 is stopped. Specifically, the control lamp serving as the visual notifying means 42 is turned off (step S290). When the exhaust temperature T has not dropped by equal to or more than the predetermined value of temperature T4 from the control starting temperature Ts, it is judged that there is continuously a possibility of excessive rise in temperature. Then, the low-rotation and low-load prohibition mode continues, and the low-rotation and low-load prohibition control is terminated.

With such a configuration, it is possible to reliably prevent an excessive rise in temperature inside the particulate filter 10, and thus to prevent thermal degradation of the particulate filter 10. Further, the diesel engine prohibits itself from entering the predetermined low-rotation and low-load area Area3 only when the temperature integrated value P for a predetermined period of time exceeds the predetermined value P1. This makes it possible to promptly prohibit entering the low-rotation and low-load area Area3 when the temperature is excessively rising to significantly exceed the third set temperature T3, and thus to prevent thermal degradation.

Further, releasing the control of prohibiting entrance of the low-rotation and low-load area Area3 rapidly enables driving in the low-rotation and low-load area Area3, making it possible to prevent unnecessary consumption of fuel. Further, even if the temperature does not drop to a predetermined temperature, the diesel engine rapidly recovers its driving range when the exhaust temperature T, which is the temperature of the particulate filter 10, drops by a predetermined value of temperature from the control starting temperature Ts, which is the temperature at the time of starting the control of prohibiting entrance of the low-rotation and low-load area Area3. This minimizes adverse effects on the driving.

Embodiment 4

In another embodiment, as shown in FIG. 6, first, it is judged whether the control mode is the low-rotation and low-load prohibition mode (step S310). When the control mode is not the low-rotation and low-load prohibition mode, it is judged whether the exhaust temperature T of the particulate filter 10 sensed by the temperature sensor 20c is equal to or higher than the third set temperature T3 (step S320). When the exhaust temperature T is equal to or lower than the third set temperature T3, the integrated value P is reset (step S321) and a maximum temperature Tmax is reset (step S322). Then, the low-rotation and low-load prohibition control is terminated. When the exhaust temperature T is equal to or higher than the third set temperature T3, next, it is judged whether the exhaust temperature T is equal to or higher than the maximum temperature Tmax (step S330). When the exhaust temperature T is equal to or higher than the maximum temperature Tmax, a temperature-time integration is carried out to update the integrated value P (step S331) and thus to update the maximum temperature Tmax (step S332). Next, it is judged whether the integrated value P is equal to or higher than the predetermined value P1 (step S340). When the integrated value P is lower than the predetermined value P1, it is judged that there is no possibility of excessive rise in temperature, and the low-rotation and low-load prohibition control is terminated. When the integrated value P is equal to or higher than the predetermined value P1, it is judged that there is a possibility of excessive rise in temperature. Then, the low-rotation and low-load prohibition mode starts (step S350), and the notifying means 40 is activated. Specifically, the control lamp serving as the visual notifying means 42 is turned on (step S30).

Further, when the control mode is the low-rotation and low-load prohibition mode, it is judged whether the exhaust temperature T has dropped by equal to or more than a predetermined value of temperature T5 from the maximum temperature Tmax (step S370). When the exhaust temperature T has dropped by equal to or more than the predetermined value of temperature T5 from the maximum temperature Tmax, it is judged that there is no possibility of excessive rise in temperature. Then, the low-rotation and low-load prohibition mode is released (step S380), and the notifying means 40 is stopped. Specifically, the control lamp serving as the visual notifying means 42 is turned off (step S390). When the exhaust temperature T has not dropped by equal to or more than the predetermined value of temperature T5 from the maximum temperature Tmax, it is judged that there is continuously a possibility of excessive rise in temperature. Then, the low-rotation and low-load prohibition mode continues, and the low-rotation and low-load prohibition control is terminated.

With such a configuration, it is possible to reliably prevent an excessive rise in temperature inside the particulate filter 10, and thus to prevent thermal degradation of the particulate filter 10. Further, the diesel engine prohibits itself from entering the predetermined low-rotation and low-load area Area3 only when the temperature integrated value P for a predetermined period of time exceeds the predetermined value P1. This makes it possible to promptly prohibit entering the low-rotation and low-load area Area3 when the temperature is excessively rising to significantly exceed the third set temperature T3, and thus to make it possible to prevent thermal degradation.

Further, releasing the control of prohibiting entrance of the low-rotation and low-load area Area3 rapidly enables driving in the low-rotation and low-load area Area3, making it possible to prevent unnecessary consumption of fuel. Further, even if the temperature does not drop to a predetermined temperature, the diesel engine rapidly recovers its driving range when the exhaust temperature T drops by equal to or more than a predetermined temperature width from the maximum temperature Tmax of the particulate filter 10. This minimizes adverse effects on the driving.

INDUSTRIAL APPLICABILITY

The present invention is applicable to diesel engines having exhaust emission purifiers that include particulate filters and regenerating means for forcibly removing particulates accumulated in the particulate filters.

The invention claimed is:

1. A diesel engine comprising:
a diesel-engine exhaust emission purifier comprising:
a particulate filter; and
a controller configured to:
forcibly remove a particulate accumulable in the particulate filter to regenerate the particulate filter, and
prohibit the diesel engine from entering a predetermined low-rotation and low-load area if a load rotation changes when the particulate filter has a temperature that is equal to or higher than a predetermined regulation temperature and when the particulate is accumulated in an amount that is equal to or more than a predetermined amount; and
notifying means for notifying an operator that entering the low-rotation and low-load area is prohibited.

2. The diesel engine according to claim 1, wherein the controller is configured to release control of prohibiting entrance of the low-rotation and low-load area when the temperature of the particulate filter drops to a temperature that is equal to or lower than a predetermined release temperature.

3. The diesel engine according to claim 1, further comprising a fuel injection valve or a throttle valve, and
wherein the controller is configured to forcibly remove the particulate by operating the fuel injection valve or the throttle valve.

4. The diesel engine according to claim 1, wherein the controller is configured to prohibit the diesel engine from entering the predetermined low-rotation and low-load area only when the temperature of the particulate filter is equal to or higher than the predetermined regulation temperature and is equal to or higher than the predetermined regulation temperature continuously for equal to or longer than a predetermined period of time if the load rotation changes.

5. The diesel engine according to claim 4, wherein the controller is configured to release the control of prohibiting entrance of the low-rotation and low-load area when the temperature of the particulate filter continues to drop for a predetermined period of time.

6. The diesel engine according to claim 1, wherein the controller is configured to prohibit the diesel engine from entering the predetermined low-rotation and low-load area only when the temperature of the particulate filter is equal to or higher than the predetermined regulation temperature and when a temperature integral value for a predetermined period of time exceeds a predetermined value if the load rotation changes.

7. The diesel engine according to claim 6, wherein the controller is configured to release control of prohibiting entrance of the low-rotation and low-load area when the temperature of the particulate filter drops by equal to or more than a predetermined temperature from a maximum temperature to which the temperature of the particulate filter has reached.

8. The diesel engine according to claim 6, wherein the controller is configured to release control of prohibiting entrance of the low-rotation and low-load area when the temperature of the particulate filter drops by a predetermined value of temperature from a temperature of the particulate filter at a time of starting the control of prohibiting entrance of the low-rotation and low-load area.

* * * * *